United States Patent
Lee et al.

(10) Patent No.: US 12,444,831 B2
(45) Date of Patent: Oct. 14, 2025

(54) ELECTRONIC DEVICE INCLUDING INTERPOSING BOARD FOR ANTENNA

(71) Applicant: Samsung Electronics Co., Ltd., Suwon-si (KR)

(72) Inventors: Juneseok Lee, Suwon-si (KR); Kwanghyun Baek, Suwon-si (KR); Dohyuk Ha, Suwon-si (KR); Jungho Park, Suwon-si (KR); Sangho Lee, Suwon-si (KR); Youngju Lee, Suwon-si (KR); Wuseong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 18/185,085

(22) Filed: Mar. 16, 2023

(65) Prior Publication Data
US 2023/0216180 A1    Jul. 6, 2023

Related U.S. Application Data

(63) Continuation of application No. PCT/KR2022/010274, filed on Jul. 14, 2022.

(30) Foreign Application Priority Data

Jul. 16, 2021 (KR) .................. 10-2021-0093647

(51) Int. Cl.
*H01Q 1/24* (2006.01)
*H01Q 1/22* (2006.01)

(52) U.S. Cl.
CPC .......... *H01Q 1/246* (2013.01); *H01Q 1/2283* (2013.01)

(58) Field of Classification Search
CPC .... G06V 10/247; G06V 10/44; G06V 10/757; G07D 2207/00; G07D 7/162;
(Continued)

(56) References Cited

U.S. PATENT DOCUMENTS

| 9,837,701 B2 | 12/2017 | Yen |
| 10,594,019 B2 | 3/2020 | Baks et al. |

(Continued)

FOREIGN PATENT DOCUMENTS

| JP | 2009-141386 A | 6/2009 |
| JP | 2014-175773 A | 9/2014 |

(Continued)

OTHER PUBLICATIONS

International Search Report and written opinion dated Nov. 16, 2022, issued in International Application No. PCT/KR2022/010274.

(Continued)

*Primary Examiner* — Thien M Le
(74) *Attorney, Agent, or Firm* — Jefferson IP Law, LLP

(57) ABSTRACT

A 5th Generation (5G) or pre-5G communication system for supporting a data transfer rate higher than that of a post-4th Generation (4G) communication system such as Long Term Evolution (LTE) is provided. The radio unit (RU) device includes a first printed circuit board (PCB) on which a plurality of antenna elements are disposed, a second PCB on which a radio frequency integrated circuit (RFIC) is disposed, and a third PCB configured to electrically connect each of the plurality of antenna elements and the RFIC between the first PCB and the second PCB, a first surface of the third PCB is coupled to a first surface of the first PCB through a grid array, and positions of feeding ports on the first surface of the third PCB correspond to positions in which ports of the plurality of antenna elements are disposed on a second surface opposite the first surface of the first PCB.

20 Claims, 14 Drawing Sheets

(58) Field of Classification Search
CPC ............ G07D 7/206; H01L 2223/6677; H01Q 1/2283; H01Q 1/246; H01Q 21/065
See application file for complete search history.

(56) References Cited

U.S. PATENT DOCUMENTS

| | | | |
|---|---|---|---|
| 10,797,405 B1 | 10/2020 | Baek et al. | |
| 11,309,621 B2 | 4/2022 | Baek et al. | |
| 11,357,099 B2 | 6/2022 | Baek et al. | |
| 2015/0183031 A1* | 7/2015 | Qu | B24B 3/24 451/48 |
| 2016/0249458 A1* | 8/2016 | Tourne | H05K 3/403 |
| 2016/0336646 A1 | 11/2016 | Baek et al. | |
| 2017/0117263 A1* | 4/2017 | Yeh | H01L 25/0657 |
| 2018/0159203 A1 | 6/2018 | Baks et al. | |
| 2018/0240762 A1 | 8/2018 | Kamgaing et al. | |
| 2019/0229426 A1 | 7/2019 | Kim et al. | |
| 2019/0280368 A1 | 9/2019 | Khan et al. | |
| 2020/0137884 A1 | 4/2020 | Markish et al. | |
| 2020/0227832 A1 | 7/2020 | Nemoto et al. | |
| 2020/0267828 A1* | 8/2020 | Moon | H01F 27/025 |
| 2020/0328167 A1 | 10/2020 | Chang Chien et al. | |
| 2020/0329556 A1 | 10/2020 | Baek et al. | |
| 2020/0367176 A1* | 11/2020 | Lee | G06F 1/203 |
| 2020/0374750 A1* | 11/2020 | Lee | H04W 28/0278 |
| 2020/0411978 A1* | 12/2020 | Jeon | H01Q 21/08 |
| 2021/0036413 A1 | 2/2021 | Kim et al. | |
| 2021/0044026 A1 | 2/2021 | Cho et al. | |
| 2021/0249751 A1* | 8/2021 | Lee | H01Q 1/02 |
| 2021/0280964 A1* | 9/2021 | Hong | H04B 1/00 |
| 2023/0099560 A1 | 3/2023 | Ha et al. | |

FOREIGN PATENT DOCUMENTS

| | | |
|---|---|---|
| KR | 10-2019-0043328 A | 4/2019 |
| KR | 10-2019-0073856 A | 6/2019 |
| KR | 10-2020-0120352 A | 10/2020 |
| KR | 10-2020-0120543 A | 10/2020 |
| KR | 10-2021-0044640 A | 4/2021 |
| WO | 19190417 A1 | 10/2019 |

OTHER PUBLICATIONS

Sanming Hu et al., TSV Technology for Millimeter-Wave and Terahertz Design and Applications, IEEE Transactions on Components, Packaging, and Manufacturing Technology, IEEE, USA, vol. 1, No. 2, Dec. 23, 2010, pp. 260-267, XP011351130.

Extended European Search Report dated Nov. 26, 2024, issued in European Patent Application No. 22842478.4.

Korean Office Action dated Aug. 25, 2025, issued in Korean Patent Application No. KR10-2021-0093647.

* cited by examiner

251

261 263 265 267

270

ELECTRONIC DEVICE INCLUDING INTERPOSING BOARD FOR ANTENNA

CROSS-REFERENCE TO RELATED APPLICATION(S)

This application is a continuation application, claiming priority under § 365(c), of an International application No. PCT/KR2022/010274, filed on Jul. 14, 2022, which is based on and claims the benefit of a Korean patent application number 10-2021-0093647, filed on Jul. 16, 2021, in the Korean Intellectual Property Office, the disclosure of which is incorporated by reference herein in its entirety.

TECHNICAL FIELD

The disclosure relates to a wireless communication system. More particularly, the disclosure relates to an electronic device including an interposing board for an antenna in a wireless communication system.

BACKGROUND ART

To meet a demand on wireless data traffic which has been in an increasing trend after a 4th Generation (4G) communication system was commercialized, there is an ongoing effort to develop an improved 5th Generation (5G) communication system or a pre-5G communication system. For this reason, the 5G communication system or the pre-5G communication system is called a beyond 4G network communication system or a post Long Term Evolution (LTE) system.

To achieve a high data transfer rate, the 5G communication system is considered to be implemented in a millimeter wave (mmWave) band (e.g., such as a 60 GHz band). To reduce a propagation path loss at the mmWave band and to increase a propagation delivery distance, beamforming, massive Multiple Input Multiple Output (MIMO), full dimensional MIMO (FD-MIMO), array antenna, analog beam-forming, and large scale antenna techniques are under discussion in the 5G communication system.

In addition, to improve a network of a system, techniques such as an evolved small cell, an advanced small cell, a cloud Radio Access Network (RAN), an ultra-dense network, Device to Device (D2D) communication, a wireless backhaul, a moving network, cooperative communication, Coordinated Multi-Points (CoMP), and reception interference cancellation, or the like are being developed in the 5G communication system.

In addition thereto, Hybrid Frequency shift keying and Quadrature Amplitude Modulation (FQAM) and Sliding Window Superposition Coding (SWSC) as an Advanced Coding Modulation (ACM) technique and Filter Bank Multi Carrier (FBMC), Non Orthogonal Multiple Access (NOMA), and Sparse Code Multiple Access (SCMA), or the like as an advanced access technology are being developed in the 5G system.

Products equipped with multiple antennas to improve communication performance have been developed, and it is expected that equipment having a gradually increasing number of antennas will be used. In line with the increasing number of antenna elements in communication devices, there are increasing demands for antenna structures for reducing loss during signal transmission in order to improve the performance of antenna equipment.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned—mentioned problems and/or disadvantages and to provide at least the advantages described below. Accordingly, an aspect of the disclosure is to provide an electronic device including an interposing board for reducing the burden of a radio unit (RU) board in a wireless communication system.

Another aspect of the disclosure is to provide an electronic device including an interposing board for providing vertical connection to an antenna element of a RU board in a wireless communication system.

Another aspect of the disclosure is to provide an electronic device for providing a high performance by minimizing the length of a transmission line on a RU board in a wireless communication system.

Additional aspects will be set forth in part in the description which follows and, in part, will be apparent from the description, or may be learned by practice of the presented embodiments.

Technical Solution

In accordance with an aspect of the disclosure, a radio unit (RU) device is provided. The RU device includes a first printed circuit board (PCB) on which a plurality of antenna elements are disposed, a second PCB on which a radio frequency integrated circuit (RFIC) is disposed, and a third PCB configured to electrically connect each of the plurality of antenna elements disposed on the first PCB and the RFIC disposed on the second PCB, wherein a first surface of the third PCB is coupled to a first surface of the first PCB through a grid array, and wherein positions of feeding ports on the first surface of the third PCB correspond to positions in which ports of the plurality of antenna elements are disposed on a second surface opposite the first surface of the first PCB.

In accordance with another aspect of the disclosure, an electronic device is provided. The electronic device includes a power interface, a local oscillator (LO), an intermediate frequency (IF) conversion circuit, a first printed circuit board (PCB) on which a plurality of antenna elements are disposed, a second PCB on which a radio frequency integrated circuit (RFIC) is disposed, and a third PCB configured to electrically connect each of the plurality of antenna elements disposed on the first PCB and the RFIC disposed on the second PCB, wherein the first surface of the third PCB is coupled to the first surface of the first PCB through a grid array, and wherein positions of feeding ports on the first surface of the third PCB correspond to positions at which ports of the plurality of antenna elements are disposed on the second surface opposite the first surface of the first PCB.

Advantageous Effects

A device and a method according to various embodiments of the disclosure may have an interposing board disposed between a RU board and a package board for a RFIC, thereby reducing the burden of the RU board and improving the overall feeding performance.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

BEST MODE

Figure 1:
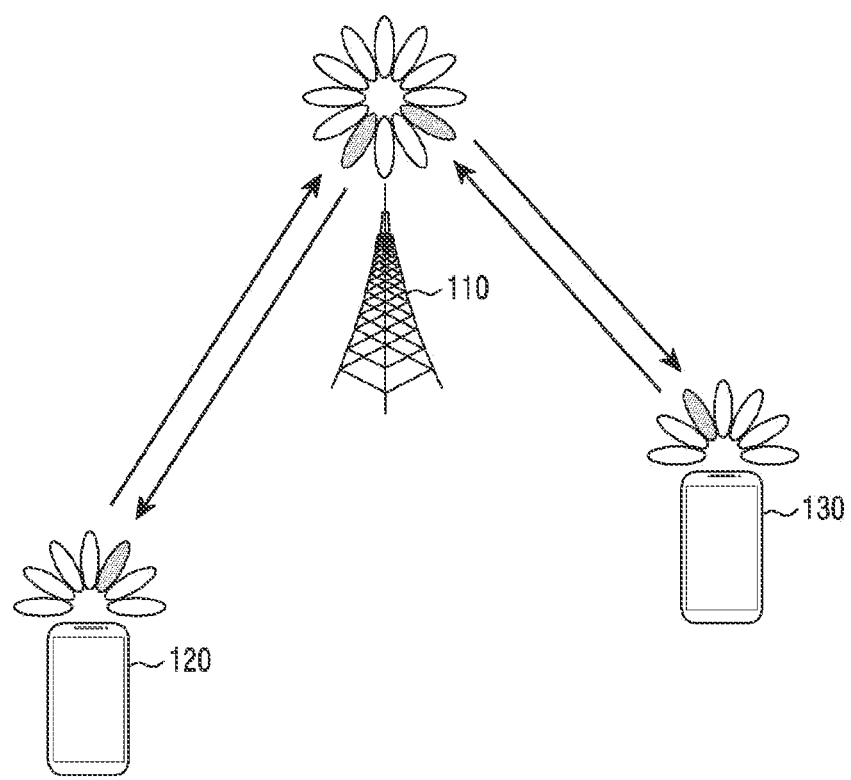
FIG. 1 illustrates a wireless communication system according to an embodiment of the disclosure.

In accordance with an aspect of the disclosure, a radio unit (RU) device is provided. The RU device includes a first printed circuit board (PCB) on which a plurality of antenna elements are disposed, a second PCB on which a radio frequency integrated circuit (RFIC) is disposed, and a third PCB configured to electrically connect each of the plurality of antenna elements disposed on the first PCB and the RFIC disposed on the second PCB, wherein a first surface of the third PCB is coupled to a first surface of the first PCB through a grid array, and wherein positions of feeding ports on the first surface of the third PCB correspond to positions in which ports of the plurality of antenna elements are disposed on a second surface opposite the first surface of the first PCB.

In accordance with another aspect of the disclosure, an electronic device is provided. The electronic device includes a power interface, a local oscillator (LO), an intermediate frequency (IF) conversion circuit, a first printed circuit board (PCB) on which a plurality of antenna elements are disposed, a second PCB on which a radio frequency integrated circuit (RFIC) is disposed, and a third PCB configured to electrically connect each of the plurality of antenna elements disposed on the first PCB and the RFIC disposed on the second PCB, wherein the first surface of the third PCB is coupled to the first surface of the first PCB through a grid array, and wherein positions of feeding ports on the first surface of the third PCB correspond to positions at which ports of the plurality of antenna elements are disposed on the second surface opposite the first surface of the first PCB.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

FIG. 1 illustrates a wireless communication system according to an embodiment of the disclosure. A wireless communication environment 100 of FIG. 1 exemplifies a base station 110, a terminal 120 and a terminal 130 as some of nodes using a wireless channel.

Referring to FIG. 1, the base station 110 is a network infrastructure that provides a wireless connection to the terminal 120. The base station 110 has a coverage defined as a certain geographic area based on a distance through which a signal can be transmitted. In addition to the base station, the base station 110 may be referred to as a massive multiple input multiple output (MMU) unit, an "access point (AP)", an "eNodeB (eNB)", a "5th generation node (5G node)", a 5G NodeB (NB), a "wireless point", a "transmission/reception point (TRP)", an "access unit", a "distributed unit (DU)", a "radio unit (RU)", a "remote radio head (RRH)", or other terms with equivalent technical meanings. The base station 110 may transmit a downlink signal or may receive an uplink signal.

The terminal 120 is a device used by a user, and performs communication with the base station 110 through a wireless channel. In some cases, the terminal 120 may be operated without the user's involvement. That is, the terminal 120 is a device that performs machine type communication (MTC) and may not be carried by a user. The terminal 120 may be referred to as "user equipment (UE)", a "mobile station", a "subscriber station", "customer premises equipment (CPE)", a "remote terminal", a "wireless terminal", an "electronic device", a "terminal for vehicle", a "user device", or other terms with equivalent technical meanings.

The terminal 120 and a terminal 130 shown in FIG. 1 may support vehicle communication. In the case of vehicle communication, in an LTE system, standardization work for vehicle-to-everything (V2X) technology based on a device-to-device (D2D) communication structure has been completed in third generation partnership project (3GPP) Release 14 and Release 15, and efforts are being made to develop V2X technology based on 5G new radio (NR). NR V2X supports unicast communication, groupcast (or multicast) communication, and broadcast communication between a terminal and a terminal.

As one of techniques for alleviating propagation path loss and increasing a propagation distance of radio waves, a beamforming technique is used. Beamforming, in general, uses a plurality of antennas to concentrate the arrival area of radio waves or to increase the directivity of reception sensitivity for a specific direction. Accordingly, in order to form a beamforming coverage instead of forming a signal in an isotropic pattern by using a single antenna, communication equipment may be provided with a plurality of antennas. Hereinafter, an antenna array including a plurality of antennas will be described.

The base station 110 or the terminal 120 may include an antenna array. Each antenna included in the antenna array may be referred to as an array element or an antenna element. Hereinafter, although the antenna array is illustrated as a two-dimensional planar array in the disclosure, this is only an example and does not limit other embodiments of the disclosure. The antenna array may be configured in various forms, such as a linear array or a multilayer array. The antenna array may be referred to as a massive antenna array.

A major technology for improving the data capacity of 5G communication is beamforming technology using an antenna array connected to multiple RF paths. In order to improve communication performance, the number of components performing wireless communication is increasing. In particular, the number of antennas and the number of RF parts (e.g., amplifiers, filters) and components for processing RF signals received or transmitted through the antenna also increase, whereby space gain and cost efficiency are essentially required in constituting communication equipment while satisfying communication performance.

Figure 2A:
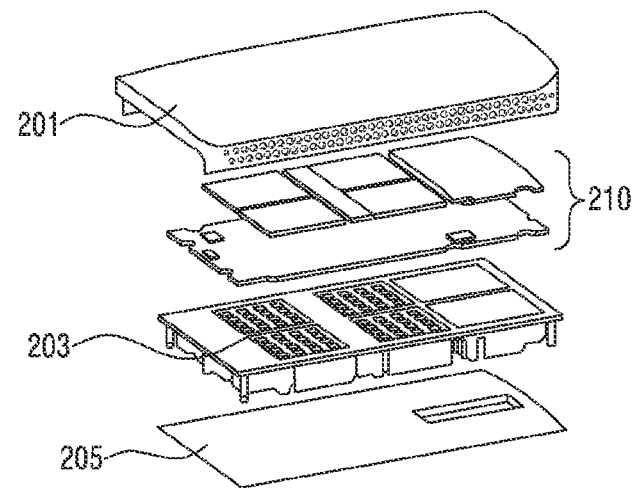
FIGS. 2A and 2B illustrate examples of components of an electronic device according to various embodiments of the disclosure.
Figure 2A:
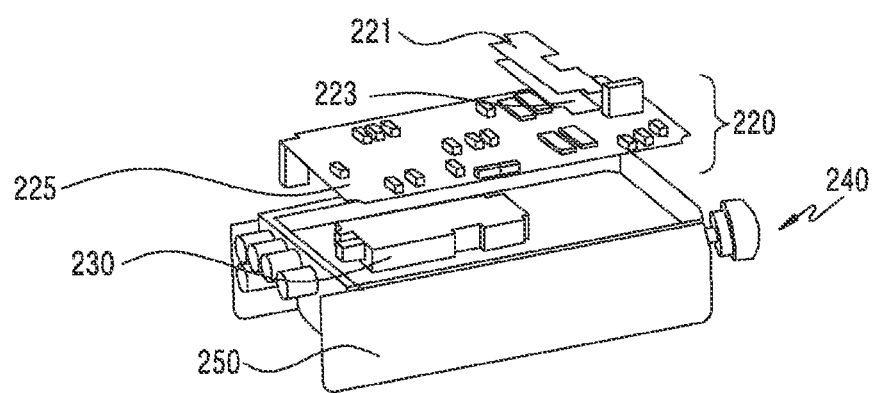
Figure 2B:
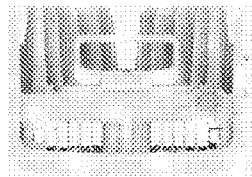
Figure 2B:
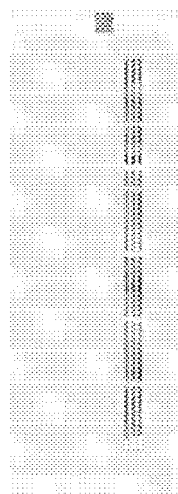
Figure 2B:
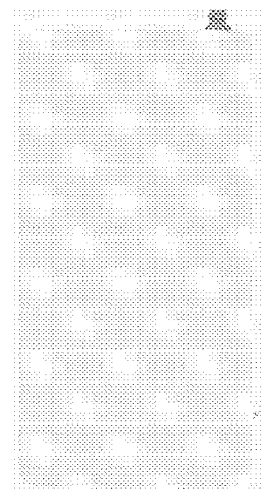
Figure 2B:
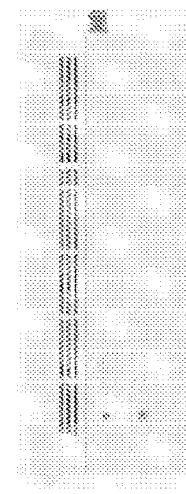
Figure 2B:
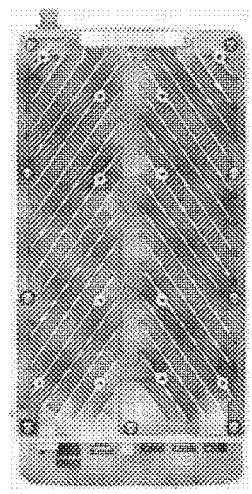
Figure 2B:
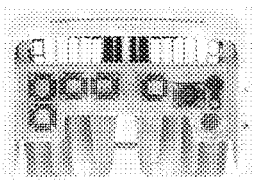

FIGS. 2A and 2B illustrate examples of components of an electronic device according to various embodiments of the disclosure. FIG. 2A illustrates internal components constituting the electronic device according to an embodiment of the disclosure, and FIG. 2B illustrates top, bottom, and side surfaces of the electronic device according to an embodiment of the disclosure.

Referring to FIG. 2A, the electronic device may include a radome cover 201, an RU housing 203, a DU cover 205, and an RU 210. The RU 210 may include an antenna module and RF components for the antenna module. The RU 210 may include an antenna module having an air-based power feeding structure according to embodiments of the disclosure to be described later. According to an embodiment, the antenna module may include a ball grid array (BGA) module antenna. The RU 210 may include an RU board 215 on which RF components are mounted.

The electronic device may include a DU 220. The DU 220 may include an interface board 221, a modem board 223, and a central processing unit (CPU) board 225. The electronic device may include a power module 230, a global positioning system (GPS) 240, and a DU housing 250.

Referring to FIG. 2B, a drawing 251 is a view of an electronic device viewed from above. Drawings 261, 263, 265, and 267 represent views of the electronic device viewed from the left, front, right, and rear, respectively. A drawing 270 is a view of the electronic device as viewed from the bottom.

Figure 3A:
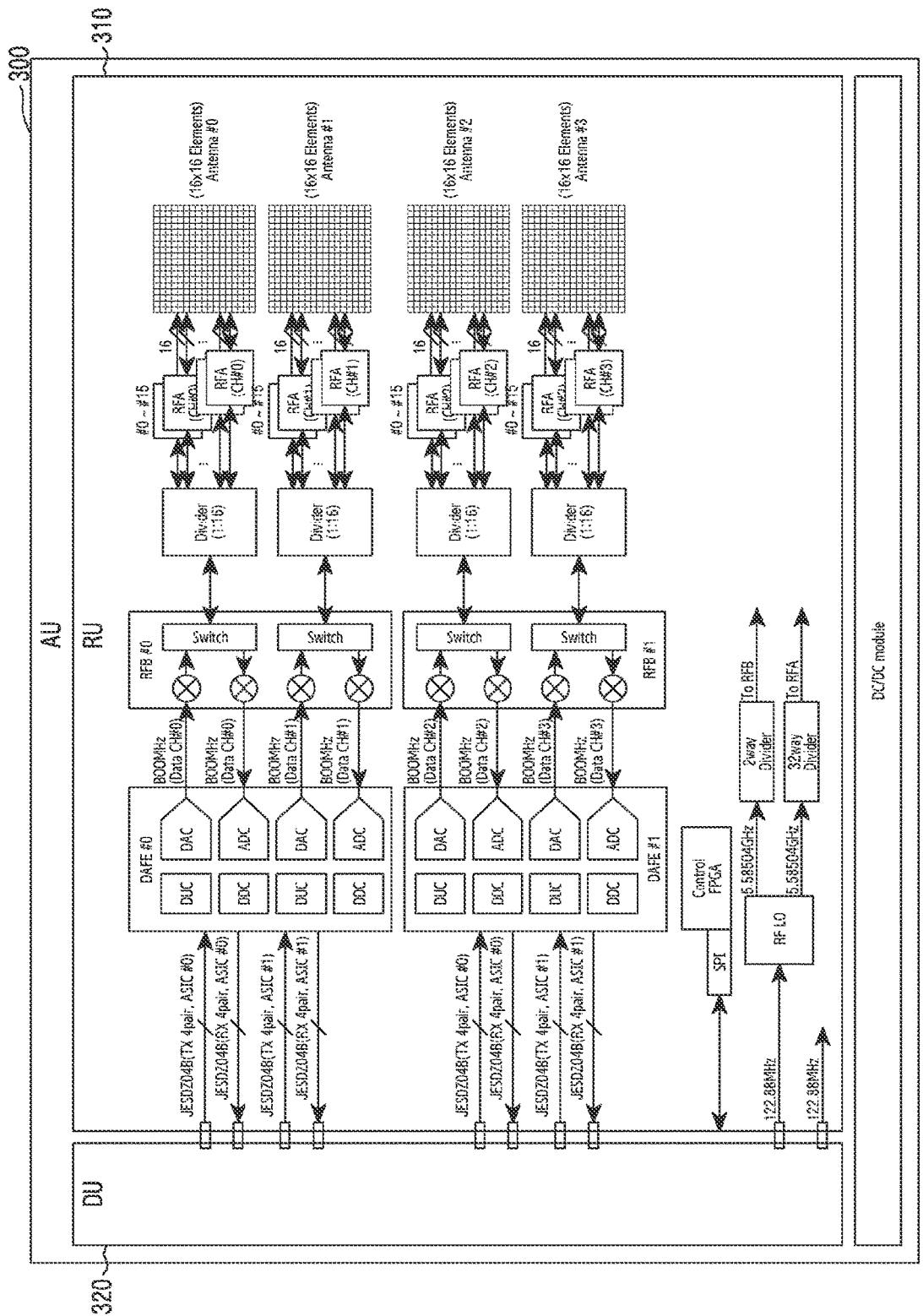
FIGS. 3A and 3B illustrate examples of functional configurations of an electronic device according to various embodiments of the disclosure.
Figure 3B:
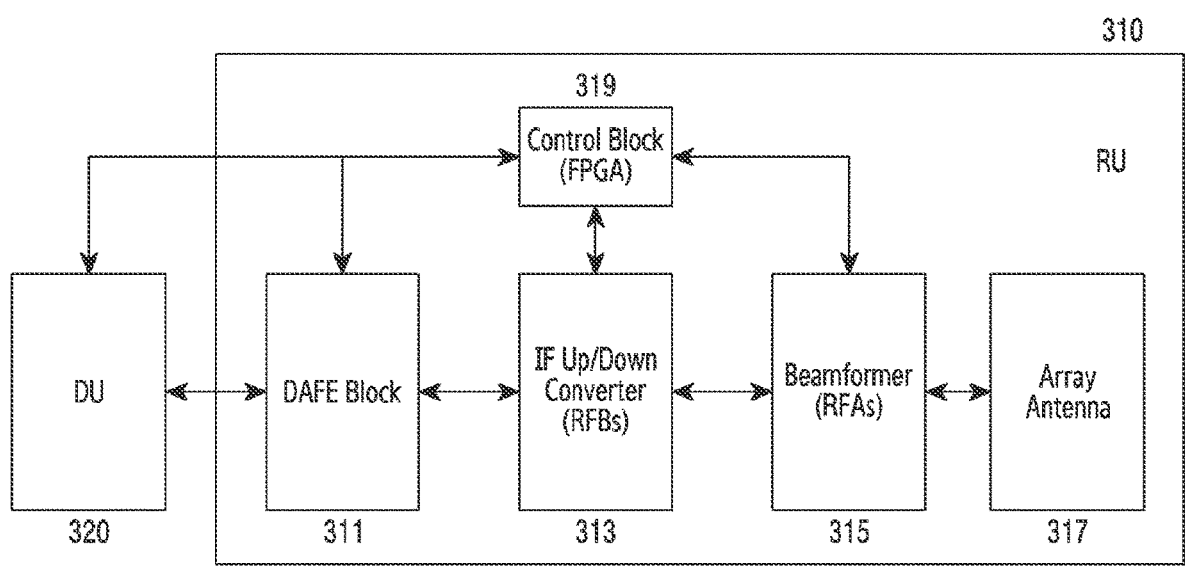

FIGS. 3A and 3B illustrate examples of functional configurations of electronic devices according to various embodiments of the disclosure. The electronic device may include an access unit (AU) 300. The AU 300 may include an RU 310, a DU 320, and a DC/DC module. The RU 310 according to embodiments of the disclosure may refer to an assembly in which antennas and RF components are mounted. The DU 320 according to the embodiments of the disclosure may be configured to process a digital radio signal, and may be configured to encrypt a digital radio signal to be transmitted to the RU 310 or decrypt a digital radio signal transmitted from the RU 310. The DU 320 may be configured to communicate with an upper node (e.g., a centralized unit (CU)) or a core network (e.g., 5GC or EPC) by processing packet data.

Referring to FIG. 3A, the RU 310 may include a plurality of antenna elements. The RU 310 may include one or more array antennas. According to an embodiment, the array antenna may be configured as a planar antenna array. The array antenna may correspond to one stream. The array antenna may include a plurality of antenna elements corresponding to one transmission path (or reception path). As an example, the array antenna may include 256 antenna elements configured as 16×16.

The RU 310 may include RF chains for processing the signal of each array antenna. The RF chains may be referred to as "RFA". The RFA may include RF components (e.g., a phase converter or a power amplifier) and mixer for beamforming. The mixer of the RFA may be configured to down-convert an RF signal of an RF frequency to an intermediate frequency or up-convert a signal of an intermediate frequency to a signal of an RF frequency. According to an embodiment, one set of RF chains may correspond to one array antenna. As an example, the RU 310 may include four RF chain sets for four array antennas. A plurality of RF chains may be connected to a transmission path or a reception path through a divider (e.g., 1:16). Although not shown in FIG. 3A, according to an embodiment, the RF chains may be implemented as an RFIC. The RFIC may process and generate RF signals supplied to a plurality of antenna elements.

The RU 310 may include a digital analog front end (DAFE) and an "RFB". The DAFE may be configured to convert digital and analog signals to and from each other. As an example, the RU 310 may include two DAFEs (DAFE #0 and DAFE #1). In the transmission path, the DAFE may be configured to up-convert a digital signal (i.e., DUC) and may convert the up-converted signal to an analog signal (i.e., a DAC). In the reception path, the DAFE may be configured to convert an analog signal to a digital signal (i.e., ADC) and may down-convert the digital signal (i.e., DDC). The RFB may include a mixer and a switch corresponding to the transmission path and the reception path. The RFB's mixer may be configured to up-convert a baseband frequency to an intermediate frequency or may down-convert a signal at an intermediate frequency to a signal at a baseband frequency.

The switch may be configured to select one of the transmission path and the reception path. As an example, the RU 310 may include two RFBs (RFB #0 and RFB #1).

The RU 310 is a control unit and may include a field programmable gate array (FPGA). The FPGA may refer to a semiconductor device that includes a designable logic device and a programmable internal circuit. The FPGA may communicate with the DU 320 through serial peripheral interface (SPI) communication.

The RU 310 may include an RF local oscillator (LO). The RF LO may be configured to supply a reference frequency for upconversion or downconversion. According to an embodiment, the RF LO may be configured to provide a frequency for up-conversion or down-conversion of the aforementioned RFB. For example, the RF LO may supply a reference frequency to RFB #0 and RFB #1 through a 2-way divider.

According to an embodiment, the RF LO may be configured to provide a frequency for up-conversion or down-conversion of the aforementioned RFA. For example, the RF LO may supply a reference frequency to each RFA (8 in each RF chain, per polarization group) through a 32-way divider.

Referring to FIG. 3B, the RU 310 may include a DAFE block 311, an IF up/down converter 313, a beamformer 315, an array antenna 317, and a control block 319. The DAFE block 311 may convert a digital signal into an analog signal or convert an analog signal into a digital signal. The IF up/down converter 313 may correspond to RFB. The IF up/down converter 313 may convert a signal at a baseband frequency into a signal at an IF frequency or may convert a signal at the IF frequency into a signal at the baseband frequency based on a reference frequency supplied from the RF LO. The beamformer 315 may correspond to RFA. The beamformer 315 may convert a signal at an RF frequency into a signal at the IF frequency or may convert a signal at the IF frequency into a signal at the RF frequency based on a reference frequency supplied from the RF LO. The array antenna 317 may include a plurality of antenna elements. Each antenna element of the array antenna 317 may be configured to radiate a signal processed through RFA. The array antenna 317 may be configured to perform beamforming according to a phase applied by the RFA. The control block 319 may control each block of the RU 310 to perform commands from the DU 320 and the above-described signal processing.

Although the base station is illustrated as an example of the electronic device in FIGS. 2A, 2B, 3A, and 3B, embodiments of the disclosure are not limited to the base station. Embodiments of the disclosure may be applied to not only the base station composed of the DU and the RU but also electronic devices for radiation of radio signals.

Figure 4:
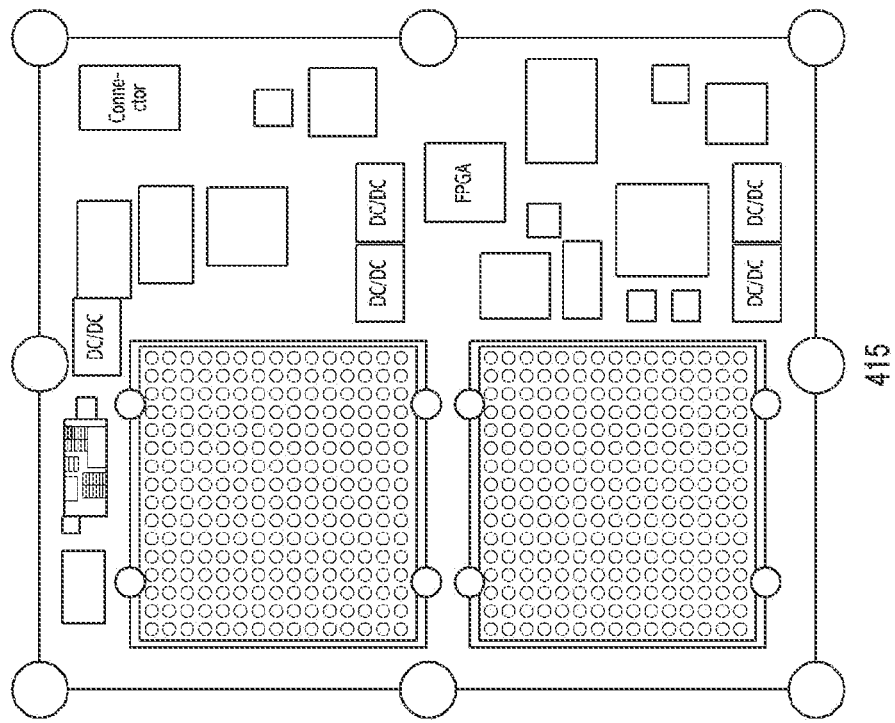
FIG. 4 illustrates an example of a radio unit (RU) board of an electronic device according to an embodiment of the disclosure.
Figure 4:
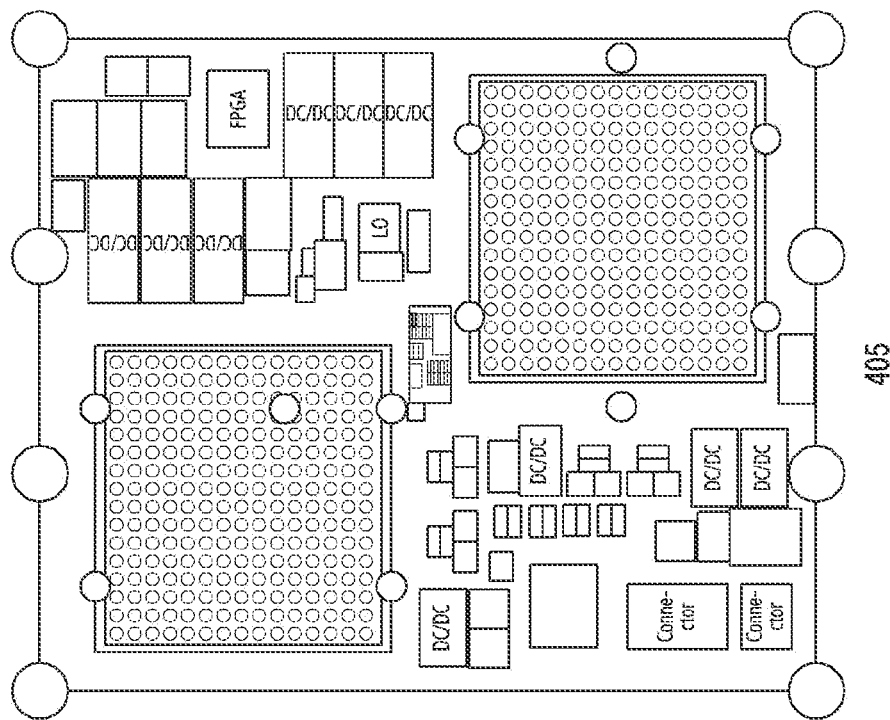

FIG. 4 illustrates an example of a radio unit (RU) board of an electronic device according to an embodiment of the disclosure. The electronic device refers to a structure in which a PCB (hereinafter, referred to as a first PCB) on which an antenna is mounted and a PCB (hereinafter, referred to as a second PCB) on which array antennas and components (e.g., a connect, a direct current (DC)/DC converter, and DFE) for signal processing are mounted are separated and arranged. The first PCB may be referred to as an antenna board, an antenna substrate, a radiating substrate, a radiating board, or an RF board. The second PCB may be referred to as an RU board, a main board, a power board, a mother board, a package board, or a filter board.

Referring to FIG. 4, the RU board may include components for transmitting a signal to a radiator (e.g., an antenna). According to an embodiment, one or more antenna PCBs (i.e., first PCBs) may be mounted on the RU board. That is, one or more array antennas may be mounted on the RU board. As an example, two array antennas may be mounted on the RU board. According to an embodiment, the array antennas may be disposed at symmetrical positions on the RU board in 405. According to another embodiment, the array antennas may be disposed on one side (e.g., left) on the RU board, and RF components to be described later may be disposed on the other side (e.g., right) in 415. Although two array antennas are illustrated in FIG. 4, embodiments of the disclosure are not limited thereto. To support a dual band, two array antennas may be disposed for each band, and the array antennas mounted on the RU board may be configured to support 2-transmit 2-receive (2T2R).

The RU board may include components for supplying an RF signal to the antenna. According to an embodiment, the RU board may include one or more DC/DC converters. The DC/DC converter may be used to convert direct current to direct current. According to an embodiment, the RU board may include one or more local oscillators (LOs). The LO may be used to supply a reference frequency for up-conversion or down-conversion in an RF system. According to an embodiment, the RU board may include one or more connectors. The connector may be used to transmit electrical signals. According to an embodiment, the RU board may include one or more dividers. The divider may be used to distribute an input signal and may transmit the distributed input signal to multiple paths. According to an embodiment, the RU board may include one or more low-dropout regulators (LDOs). The LDO may be used to suppress external noise and supply power. According to an embodiment, the RU board may include one or more voltage regulator modules (VRMs). The VRM may refer to a module for ensuring that an appropriate voltage is maintained. According to an embodiment, the RU board may include one or more digital front ends (DFEs). According to an embodiment, the RU board may include one or more radio frequency programmable gain amplifiers (FPGAs). According to an embodiment, the RU board may include one or more intermediate frequency (IF) processing units. Meanwhile, as the configuration illustrated in FIG. 4, some of the components illustrated in FIG. 4 may be omitted or a larger number of components may be mounted. In addition, although not mentioned in FIG. 4, the RU board may further include an RF filter for filtering the signal.

With the introduction of mmWave band (e.g., frequency range 2 of 3GPP), the array antenna may be manufactured using a PCB method. That is, when manufacturing the PCB of the RU board, the antenna element may be manufactured together with the PCB. In this case, in order to improve signal reception and transmission quality, signal lines such as RF/IF/LO are often configured on one board without a connector. This is because the connector causes losses due to PCB-to-PCB coupling. On the other hand, since one main board is in charge of many functions, the size of the main board increases and design complexity increases. These problems are a factor in the price increase.

In order to minimize the price increase of the main PCB and maintain the performance, there is a trend to implement an RF feeding line with high complexity among the signal lines (here, the RF feeding line means a horizontal feeding line on a PCB layer) and the antenna on a separate board. When configuring the RF line on another board different from the main PCB without a connector, a contact interconnection method (e.g., BGA or surface mount device (SMD)) and a non-contact interconnection method (e.g., capacitive coupling or resonant coupling) may be used. On the other hand, the array antenna for the base station has different antenna numbers and layouts depending on the product, and in some cases, a large array antenna including 256 or more antenna elements is required. Even on a board (ant/RF board) that separates the RF feeding line and antenna, the price increase due to the size of the board cannot be ignored when a large array antenna is implemented as one board. When the ant/RF board is manufactured by grouping a small number of array antennas, the antenna arrangement may be different depending on the manufacturing tolerance, so there is a problem in that radiation performance is deteriorated.

Figure 5A:
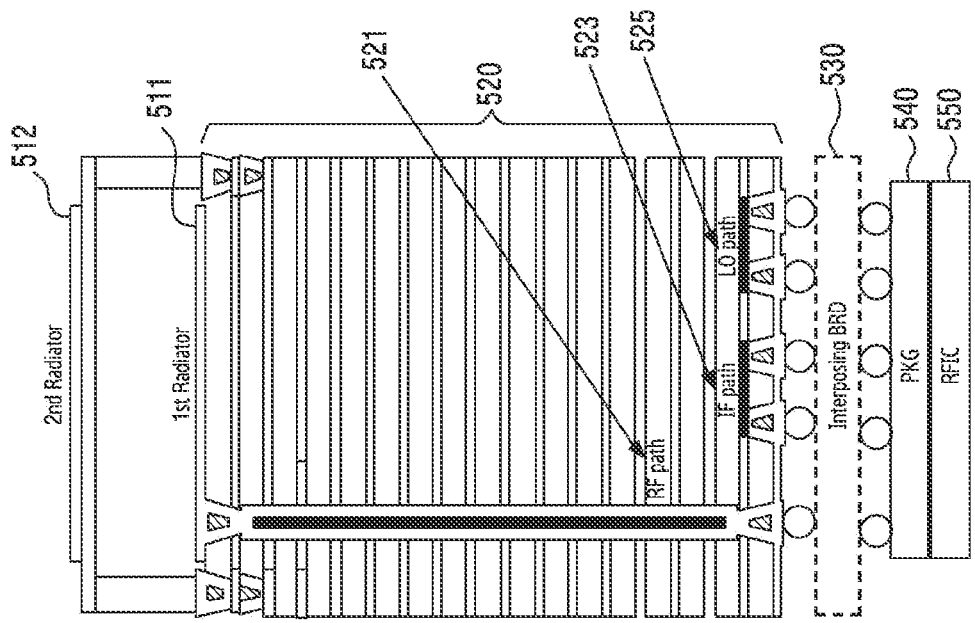
FIGS. 5A and 5B illustrate an example of arrangement of an interposing board according to various embodiments of the disclosure.
Figure 5A:
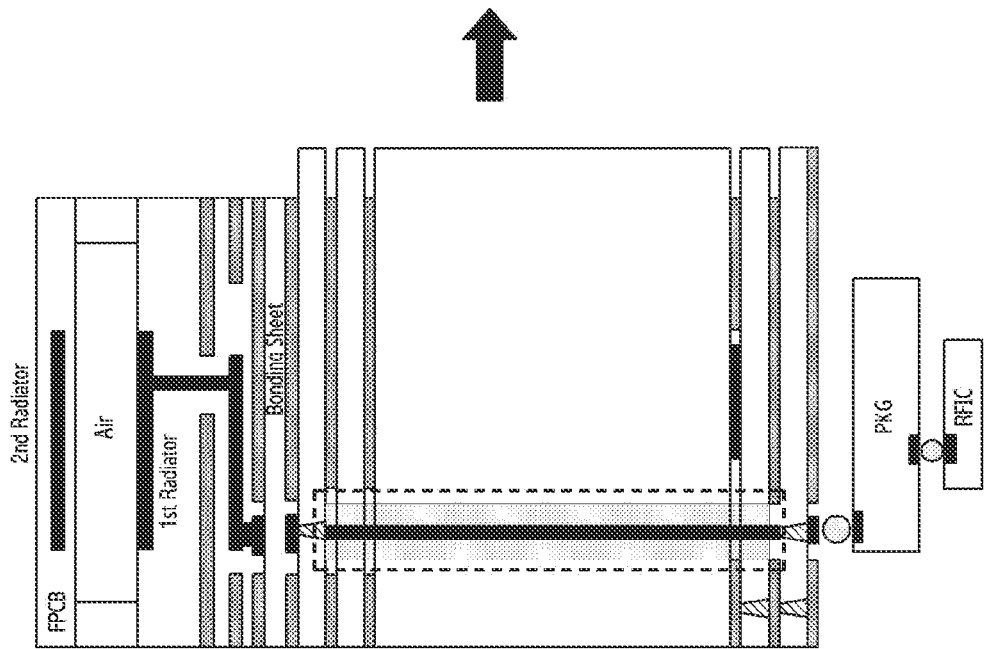
Figure 5B:
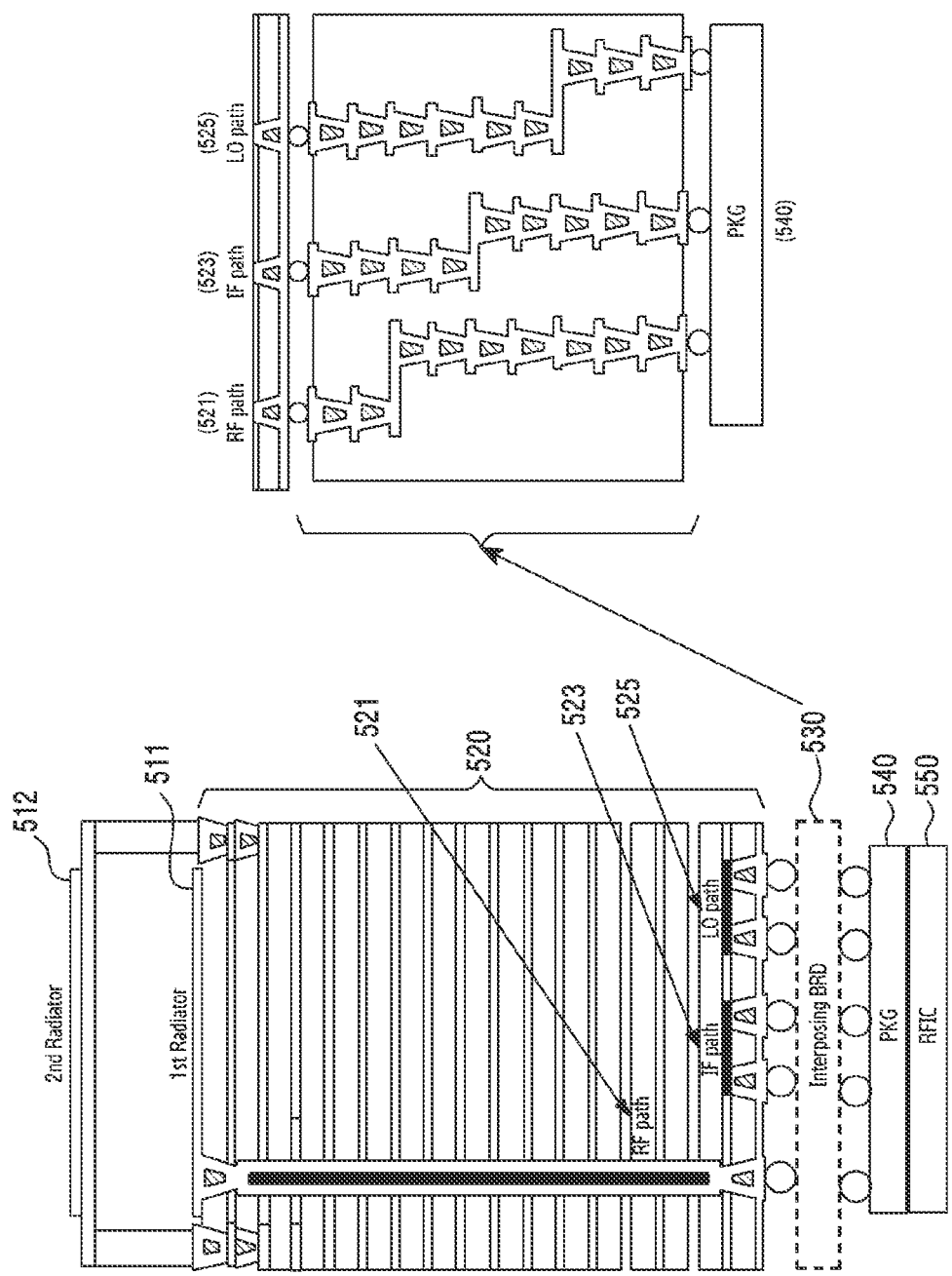

FIGS. 5A and 5B illustrate an example of arrangement of an interposing board according to various embodiments of the disclosure.

FIG. 5A illustrates a stacked structure due to the arrangement of an interposing board compared to the conventional RU module according to an embodiment of the disclosure. Referring to FIG. 5B, specific functions of the interposing board will be described. Hereinafter, in the disclosure, an RF line may refer to a signal path including a feeding line provided along one layer of a PCB. The RF line may be provided along one layer of the PCB. That is, the RF line refers to a signal path including a feeding line provided in a horizontal direction. Meanwhile, an RF path is used as a term to be distinguished from the RF line. The RF path may include an RF line as well as a signal path provided vertically across a plurality of layers of the PCB.

Referring to FIG. 5A, the RU module may include an antenna unit (a first radiator 511 and a second radiator 512). The first radiator 511 may be included in the RU board 520.

The RU board 520 is a main PCB and may include components related to the RU module. Hereinafter, the RU board 520 may be referred to as a main PCB or a first PCB. According to an embodiment, the RU board 520 may be composed of a plurality of layers. Unlike the conventional RU module, in the RU module according to embodiments of the disclosure, the RF path of the antenna element, that is, the first radiator 511 may be vertically provided on the RU board 520. The RF path may refer to a signal line for supplying a signal from an RFIC 550 to the antenna or transmitting a signal from the antenna to the RFIC 550. The RFIC 550 may include RF components for RF signal processing and beamforming. The RFIC 550 may be mounted on a package board 540 (e.g., a die or SiP of a wafer). Hereinafter, the package board 540 on which the RFIC 550 is disposed may be referred to and described as an RFIC board, an RFIC PCB, or a second PCB.

An RF line may be provided in an interposing board 530 according to embodiments of the disclosure. Hereinafter, the interposing board 530 may be referred to as an interposing PCB, an RF line PCB, or a third PCB.

The interposing board 530 may be disposed between the first PCB and the second PCB. According to an embodiment, the interposing board 530 may be coupled to the RU board 520 through a grid array. Also, according to an embodiment, the interposing board 530 may be coupled to the package board 540 through a grid array. Embodiments of the disclosure propose a structure in which the antenna and the RF line are separated through the interposing board 530. Only the RF line may be separately located between the RU board 520 and the RFIC 550. Through this, the RU board 520 may feed a signal in the shortest distance. The antenna may be implemented on the RU board 520 (e.g., the first radiator 511) or implemented externally (e.g., the second radiator 512). The RF line on the main PCB may be provided vertically (e.g., vertical vias or plated through hole (PTH)), whereby minimization of transmission losses can be achieved.

Referring to FIG. 5B, a detailed example of the interposing board 530 will be described. The interposing board 530 may be configured to perform at least some of the functions for processing an RF signal of the RU board 520.

According to an embodiment, the interposing board 530 may be connected to an RF path 521. The interposing board 530 may be connected to the package board 540 of the RFIC and may be connected to the RF path 521. Hereinafter, in the disclosure, a port to which the interposing board 530 is connected to the RFIC may be referred to as an RFIC port, and a port to which the interposing board 530 is connected to the RF path may be referred to as a feeding port. The interposing board 530 may include an RF line. One of the plurality of layers of the interposing board 530 may include an RF line, that is, a feeding line provided at a position corresponding to the antenna element. As the feeding line is provided in the interposing board 530 rather than the RU board 520, which is the main board, the RU board 520 may include an RF path provided with the shortest distance while minimizing the weight of the feeding line in the RF path. Due to this, the power feeding gain may be increased.

According to an embodiment, the interposing board 530 may be connected to an IF path 523. The RU board 520 may include an IF conversion circuit (e.g., RFB of FIGS. 3A and 3B). For signal transmission from the RU board 520, the interposing board 530 may be connected to an IF path configured separately. At this time, like the RF path, in order to form a path with the shortest distance from the RU board 520, the interposing board 530 may include a feeding line for the IF path 523.

According to an embodiment, the interposing board 530 may be connected to an LO path 525. The RU board 520 may include an RF LO (e.g., the RF LO of FIG. 3A). In order to supply a reference frequency source to the mixer of the RFB or the mixer of the RFA, the interposing board 530 may be connected to the LO path 525 configured separately. At this time, like the RF path, in order to form a path with the shortest distance from the RU board 520, the interposing board 530 may include a feeding line for the LO path 525.

Figure 6:
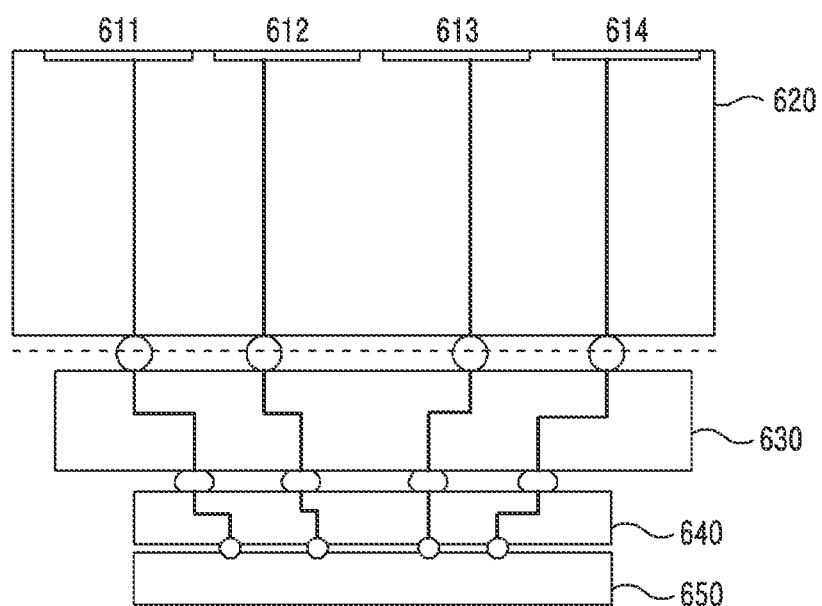
FIG. 6 illustrates an example of a stacked structure of an electronic device including an interposing board according to an embodiment of the disclosure.

FIG. 6 illustrates an example of a stacked structure of an electronic device including an interposing board according to an embodiment of the disclosure. In the disclosure, an RF line may be provided along one layer of a PCB. That is, the RF line refers to a signal path including a feeding line provided in the horizontal direction.

Referring to FIG. 6, the electronic device may include a first radiator 611, a second radiator 612, a third radiator 613, and a fourth radiator 614. The electronic device may include an RU board 620. The first radiator 611, the second radiator 612, the third radiator 613, and the fourth radiator 614 may be mounted on an RU board 620, or the first radiator 611, the second radiator 612, the third radiator 613, and the fourth radiator 614 may be disposed in the RU board 620. The RU board 620 may correspond to a main PCB.

The electronic device may include a package board 640. An RFIC 650 may be mounted on one surface of the package board 640. The package board 640 may be connected to the RFIC 650 through a grid array.

According to an embodiment of the disclosure, an interposing board 630 may be disposed between the RU board 620 and the package board 640. One surface of the interposing board 630 may be connected to the RU board 620, and the other surface of the interposing board 630 may be connected to the RU package board 640. By minimizing the length of the RF line on the RU board 620, which is the main PCB, or eliminating the corresponding RF line on the RU board 620, transmission loss can be minimized. The reason why transmission loss is possible is that the feeding line is provided through high density interconnection (HDI), that is, a process used for small PCBs, instead of a process used for large PCBs such as the main PCB (multi-layer board). Since a more detailed process is possible in a small PCB, it is possible to provide a reduction in transmission loss for the RF line to be provided on a separate PCB other than the main PCB, that is, the interposing board 630.

In addition, the interposing board 630 according to the embodiments of the disclosure may be located between the RU board 620 and the RFIC package board 640 as the main PCB, a distance from each antenna input port of the RU board 620 to the antenna may be constant. As the length of the transmission line for each RF path on the RU board 620 becomes substantially the same, calibration of the RF line becomes possible through a conduction test. Such a conduction test may be faster and more accurate than a calibration method through over the air (OTA) used in the existing antenna in package (AIP) module.

According to an embodiment, the RU board (or the first PCB), which is the main PCB of the disclosure, is a large-sized substrate and may be generated by an MLB method (e.g., line 100 um, clearance 100 um, via 125 um, land 250 um).

According to an embodiment, the interposing board (or a third PCB) for the horizontal feeding routing of the disclosure is a small substrate and may be generated by an HDI method (e.g., line 70 um, clearance 70 um, via 120 um, land 240 um).

According to an embodiment, an MLB substrate may have 18 layers, and an RF pathway may be configured to be uniform for each RF path. According to an embodiment, an HDI substrate has 10 layers, and the horizontal RF pathway is not uniform for each RF path. According to an embodiment, a package substrate has 8 layers, and the horizontal RF pathway is not uniform for each RF path. Since the RF pathway from the MLB substrate, that is, the main PCB, is uniform, by performing a conduction test between the main PCB and the interposing PCB, RF calibration may be performed according to embodiments of the disclosure.

Figure 7:
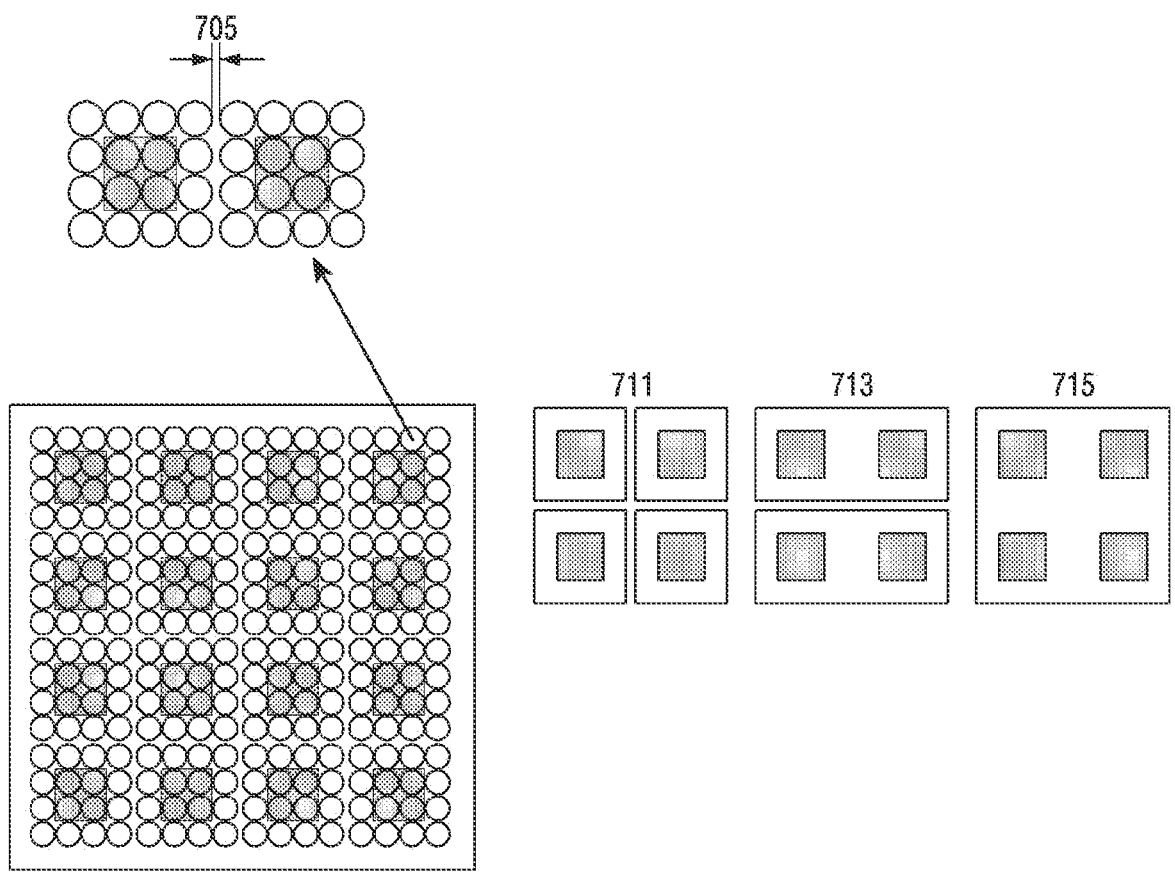
FIG. 7 illustrates an example of arrangement of an interposing board and a radio frequency integrated circuit (RFIC) according to an embodiment of the disclosure.

FIG. 7 illustrates an example of arrangement of an interposing board and a radio frequency integrated circuit (RFIC) according to an embodiment of the disclosure. In the case of combining the interposing board that separates the role of the RF line from the main PCB, the antenna arrangement does not change even when the tolerance due to assembly is taken into account, so that degradation of the radiation performance can be minimized.

Referring to FIG. 7, a gap 705 between antenna arrays may be configured in various ways. The gap 705 between the antenna arrays represents an assembly tolerance. Although the interposing board is assumed per one RFIC, two or more RFICs may also be mounted on one interposing board. For each array constituted of 16 antenna elements, an example will be described.

In a first example 711, gaps between the arrays may be formed in each of a first direction (e.g., a horizontal direction) and a second direction (e.g., a vertical direction). One RFIC and one interposing board may be disposed in each arrangement. In a second example 713, two RFICs may be disposed on one interposing board. This means that one interposing board may be disposed in a horizontal direction in which no gap is formed. That is, a gap between the arrays may be formed in a second direction (e.g., a vertical direction). In a third example 715, four RFICs may be arranged in the first direction and the second direction in the form of 2×2 on one interposing board. The arrangement of the antennas in the interposing may be combined with the interposing board without a gap considering tolerances.

FIGS. 5 and 6 illustrate the case of one interposing board per one RFIC, but embodiments of the disclosure are not limited thereto. According to an embodiment, the interposing board may be coupled to two RFICs. The interposing board may be coupled to a package board (e.g., a system-in-package (SiP) or a die for each wafer) on which two RFICs are disposed. In addition, according to another embodiment, the interposing board may be coupled to four RFICs. The interposing board may be coupled to a package board (e.g., a SiP or a die for each wafer) on which four RFICs are disposed.

Figure 8:
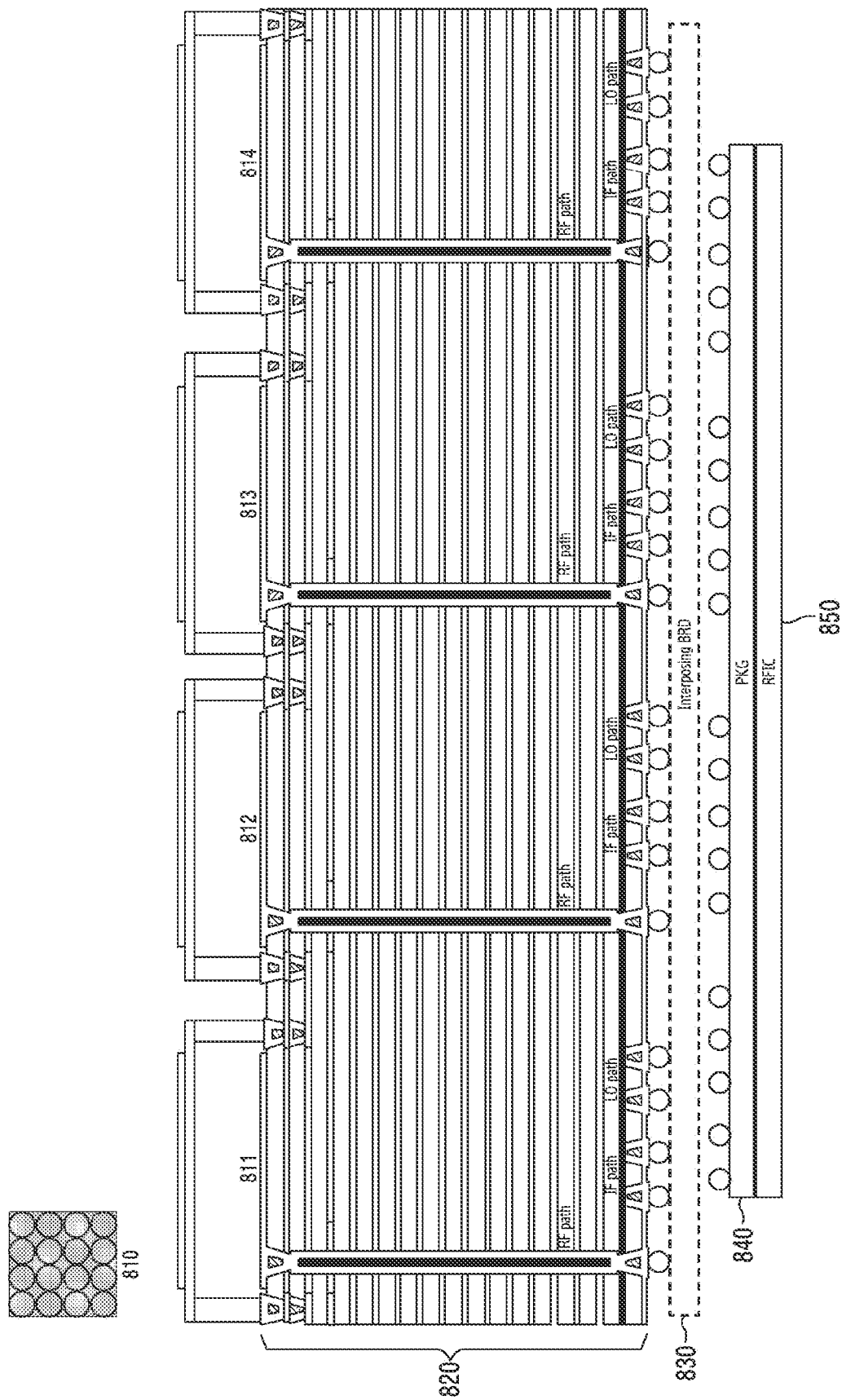
FIG. 8 illustrates an example of a stacked structure of an RU module corresponding to one RFIC according to an embodiment of the disclosure.

FIG. 8 illustrates an example of a stacked structure of an RU module corresponding to one RFIC according to an embodiment of the disclosure. Considering the overall structure, one RFIC may be configured to supply an RF signal to a plurality of radiators.

Referring to FIG. 8, the RU module may include a first radiator 811, a second radiator 812, a third radiator 813, and a fourth radiator 814. The first radiator 811, the second radiator 812, the third radiator 813, and the fourth radiator 814 may correspond to the elements of the antenna array 810, respectively.

The electronic device may include an RU board 820. The first radiator 811, the second radiator 812, the third radiator 813, and the fourth radiator 814 may be mounted on the RU board 820. Referring to FIG. 8, each radiator is shown to be mounted on the RU board, but in some embodiments, the first radiator 811, the second radiator 812, the third radiator 813, and the fourth radiator 814 may be disposed within the RU board 820. The RU board 620 may correspond to a main PCB.

The electronic device may include a package board 840. An RFIC 850 may be mounted on one surface of the package board 840. The package board 840 may be connected to the RFIC 850 through a grid array.

An interposing board 830 may be disposed between the RU board 820 and the package board 840. One surface of the interposing board 830 may be connected to the RU board 820, and the other surface of the interposing board 830 may be connected to the RU package board 840. By minimizing the length of the RF line on the RU board 820, which is the main PCB, or eliminating the RF line on the RU board 820, transmission loss can be minimized. Although one interposing board 830 is illustrated in FIG. 8, embodiments of the disclosure are not limited thereto. Unlike that shown in FIG. 8, a plurality of interposing boards may be disposed between the RU board 820 and the package board 840.

Figure 9A:
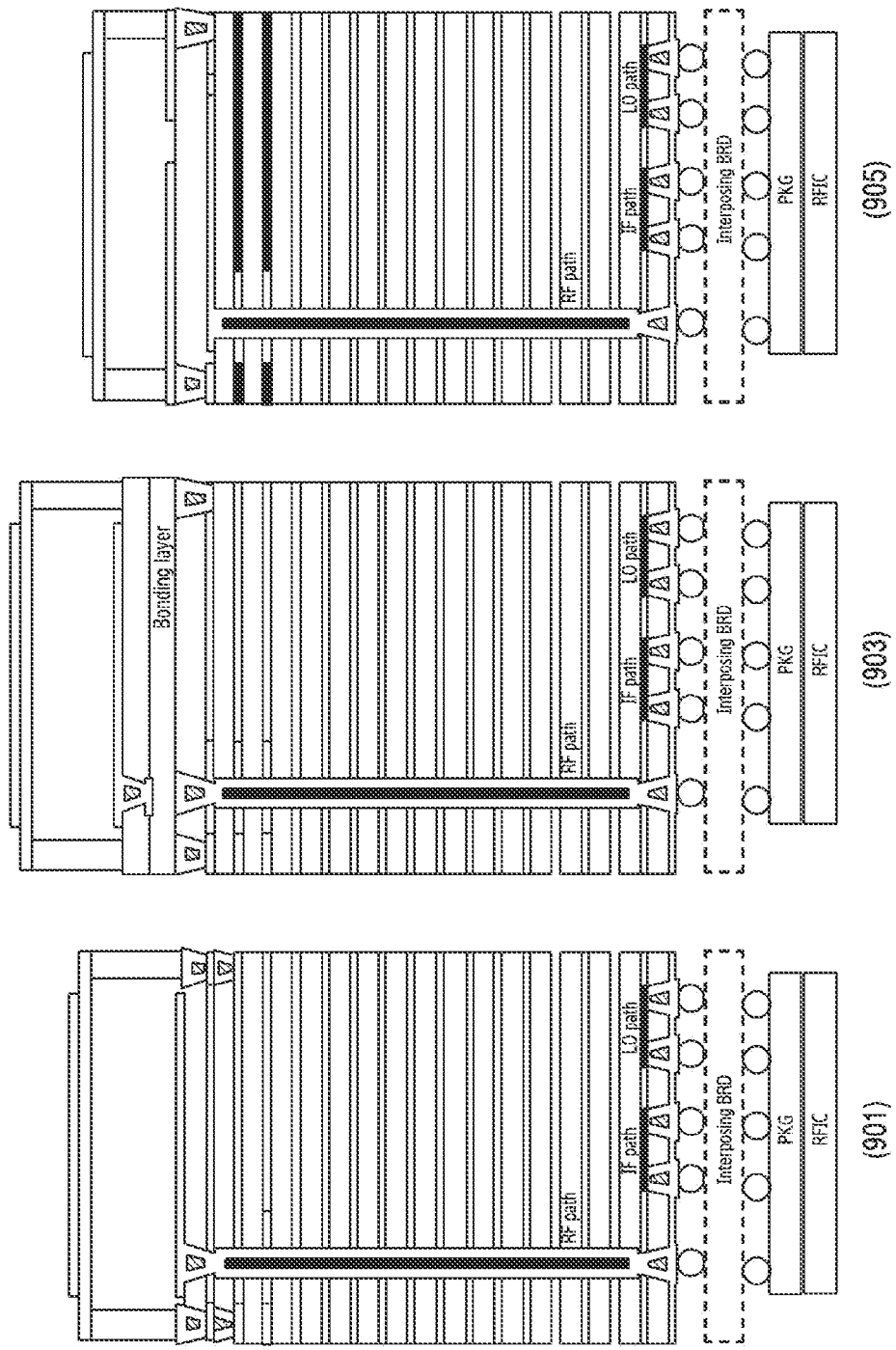
FIGS. 9A and 9B illustrate examples of electronic devices including an interposing board according to various embodiments of the disclosure.
Figure 9B:
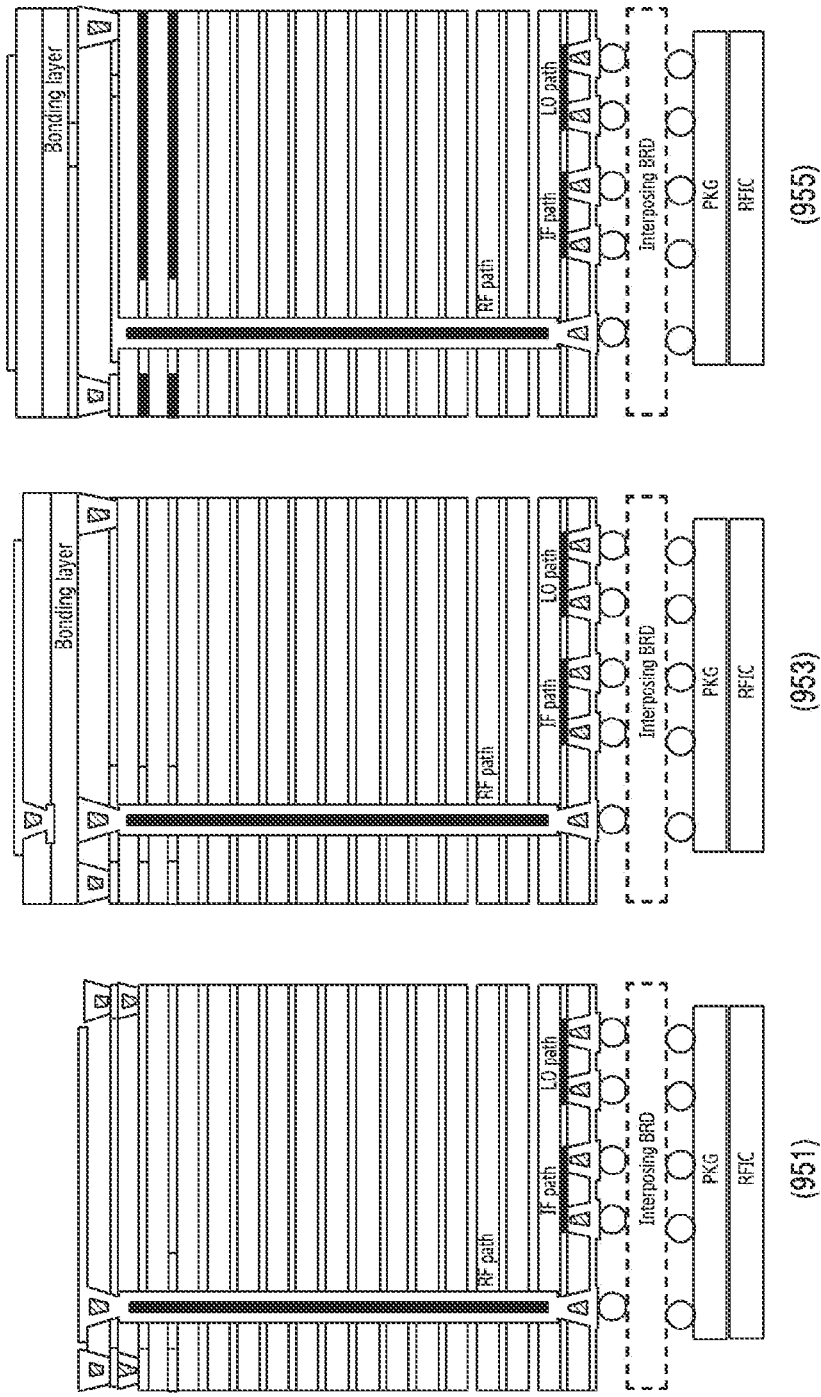

FIGS. 9A and 9B illustrate examples of electronic devices including an interposing board according to various embodiments of the disclosure.

Referring to FIG. 9A, in a first example 901, an RU module may include an interposing board disposed between a main PCB and a package PCB. An RFIC may transmit a signal to the main PCB via the interposing board. A signal may be transmitted to a radiator through an RF path provided vertically from the main PCB. The RU module may further include an additional radiator disposed to be spaced apart from the main PCB. The radiator may be disposed on a cover or a radome according to an embodiment.

In a second example 903, an RU module may include an interposing board disposed between a main PCB and a package PCB. The RFIC may transmit a signal to the main PCB via the interposing board. A signal may be transmitted to a radiator through an RF path and a bonding layer provided vertically from the main PCB. Coupling feeding may be performed in the bonding layer. The RU module may further include an additional radiator disposed to be spaced apart from the main PCB. The radiator may be disposed on a cover or a radome according to an embodiment.

In a third example 905, an RU module may include an interposing board disposed between a main PCB and a package PCB. An RFIC may transmit a signal to the main PCB via the interposing board. A signal may be transmitted to a radiator through an RF path of the main PCB and a feeding unit provided in a top layer of the main PCB. The RU module may further include an additional radiator disposed to be spaced apart from the main PCB. The radiator may be disposed on a cover or a radome according to an embodiment.

Referring to FIG. 9A, a column and an additional radiator are disposed to improve antenna radiation performance through relay feeding. However, embodiments of the disclosure are not limited thereto. Even if the antenna is not disposed on the cover or the radome, it may be understood as an embodiment of the disclosure. Each of a fourth example 951, a fifth example 953, and a sixth example 955 may refer to an RU module in which an additional radiator is excluded from the first example 901, the second example 903, and the third example 905.

The RU module according to embodiments of the disclosure may include an RU board (or a first PCB), an RFIC, a package board (or a second PCB), and an interposing board (or a third PCB). The RU module according to embodiments of the disclosure may include an interposing board disposed between the RU board and the package board on which the RFIC is disposed for RF feeding of the array antenna. According to an embodiment, the RU board, which is the main PCB, may have a larger area than the interposing board. That is, the size of the first PCB may be larger than the size of the third PCB.

According to an embodiment, the interposing board may have a larger area than the package board. That is, the size of the third PCB may be larger than the size of the second PCB. The package board is an area on which the RFIC is mounted and has a size that is relatively different from that of the RFIC depending on the implementation method. For example, when an RFIC chip is disposed in a die form on a wafer of a package board, the RFIC may have a smaller area than the package board. In addition, for example, when the RFIC is implemented in the form of SiP in the package board, the RFIC may have the same or smaller area as the package board. The interposing board according to embodiments of the disclosure may be configured to perform horizontal routing between an RF output port of an RFIC of an RFIC and an RF input port of an antenna. Since the RF lines in the main PCB perform a main function of vertical connection across a plurality of layers, the RF length corresponding to each antenna element may be substantially the same in the main PCB.

Figure 10:
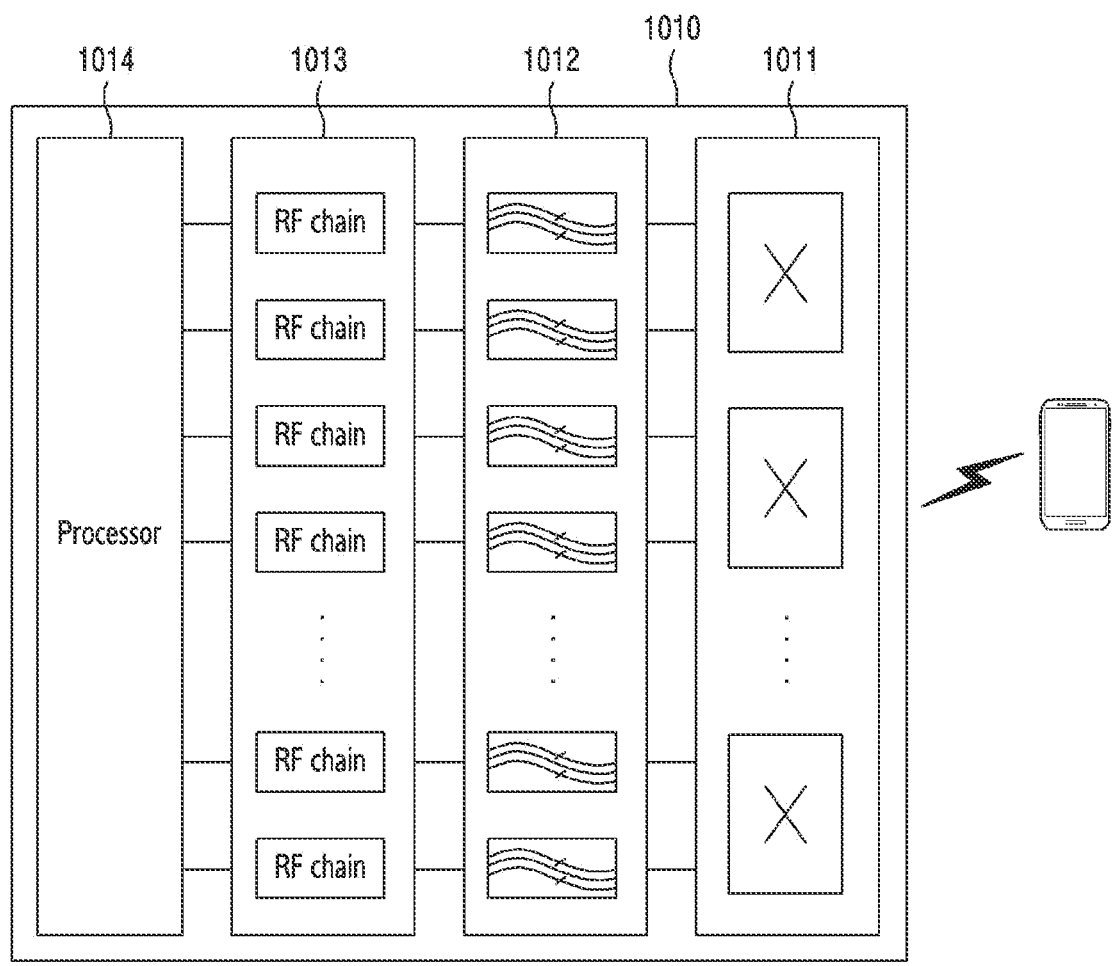
FIG. 10 illustrates a functional configuration of an electronic device having an air-based power feeding structure according to an embodiment of the disclosure.

FIG. 10 illustrates a functional configuration of an electronic device having an air-based power feeding structure according to an embodiment of the disclosure. An air-based feeding structure refers to a structure in which a feeding line is formed in an air layer provided between a board (i.e., an antenna board) on which an antenna is disposed for radiation and a board (i.e., an RU board or a main board) on which RF components (e.g., an RF signal line, a power amplifier, a filter, etc.) are disposed. When the antenna board is mounted on the main board, a feeding line may be provided in at least one of the lowermost layer of the antenna board or the uppermost layer of the main board. The electronic device 1010 may be either the base station 110 or the terminal 120 of FIG. 1. According to an embodiment, the electronic device 1010 may be base station equipment supporting mmWave communication (e.g., frequency range 2 of 3GPP). The electronic device including the antenna structure as well as the antenna structure itself described through FIGS. 1, 2A, 2B, 3A, 3B, 4, 5A, 5B, 6 to 8, 9A, and 9B may be also included in embodiments of the disclosure. The electronic device 1010 may include an RF device having an air-based feeding structure.

Referring to FIG. 10, a functional configuration of an electronic device 1010 is illustrated. The electronic device 1010 may include an antenna unit 1011, a power interface unit 1012, a radio frequency (RF) processing unit 1013, and a control unit 1014.

The antenna unit 1011 may include a plurality of antennas. The antenna performs functions for transmitting and receiving signals through a radio channel. The antenna may include a conductor formed on a substrate (e.g., a PCB) or a radiator formed of a conductive pattern. The antenna may radiate an up-converted signal on a radio channel or may acquire a signal radiated by another device. Each antenna may be referred to as an antenna element or antenna device. In some embodiments, the antenna unit 1011 may include an antenna array in which a plurality of antenna elements form an array. The antenna unit 1011 may be electrically connected to the power interface unit 1012 through RF signal lines. The antenna unit 1011 may be mounted on a PCB including a plurality of antenna elements. According to an embodiment, the antenna unit 1011 may be mounted on a PCB or a flexible PCB (FPCB). The antenna unit 1011 may provide a received signal to the power interface unit 1012 or may radiate a signal provided from the power interface unit 1012 into the air.

The power interface unit 1012 may include modules and components. The power interface unit 1012 may include one or more IFs. The power interface unit 1012 may include one or more LOs. The power interface unit 1012 may include one or more LDOs. The power interface unit 1012 may include one or more DC/DC converters. The power interface unit 1012 may include one or more DFEs. The power interface unit 1012 may include one or more FPGAs. The power interface unit 1012 may include one or more connectors. The power interface unit 1012 may include a power supply.

According to an embodiment, the power interface unit 1012 may include areas for mounting one or more antenna modules. For example, the power interface unit 1012 may include a plurality of antenna modules to support MIMO communication. The antenna module according to the antenna unit 1011 may be mounted in a corresponding area. According to an embodiment, the power interface unit 1012 may include a filter. The filter may perform filtering in order to transmit a signal at a desired frequency. The power interface unit 1012 may include a filter. The filter may perform a function to selectively identify a frequency by forming a resonance. The power interface unit 1012 may include at least one of a band pass filter, a low pass filter, a high pass filter, or a band reject filter. That is, the power interface unit 1012 may include RF circuits for obtaining a signal of a frequency band for transmission or a frequency band for reception. The power interface unit 1012 according to various embodiments may electrically connect the antenna unit 1011 and the RF processing unit 1013 to each other.

The RF processing unit 1013 may include a plurality of RF processing chains. The RF chain may include a plurality of RF components. The RF components include an amplifier, a mixer, an oscillator, a DAC, an ADC, and the like. According to an embodiment, the RF processing chain may refer to an RFIC. For example, the RF processing unit 1013 may include an up-converter that up-converts a digital transmission signal of a base band to a transmission frequency, and a digital-to-analog converter (DAC) that converts the up-converted digital transmission signal into an analog RF transmission signal. The up-converter and the DAC may form a portion of a transmit path. The transmission path may further include a power amplifier (PA) or a coupler (or combiner). In addition, for example, the RF processing unit 1013 may include an analog-to-digital converter (ADC) that converts an analog RF reception signal into a digital reception signal and a down-converter that converts the digital reception signal into a baseband digital reception signal. The ADC and the downconverter may form a portion of a reception path. The reception path may further include a low-noise amplifier (LNA) or a coupler (or divider). The RF components of the RF processing unit may be implemented on a PCB. The electronic device 1010 may include a structure in which the antenna unit 1011—the power interface unit 1012—the RF processing unit 1013 are stacked in this order. The antennas, the RF components of the power interface, and the RFICs may be implemented on a separate PCB, and filters may be repeatedly fastened between the PCB and the PCB to form a plurality of layers.

The control unit 1014 may control overall operations of the electronic device 1010. The control unit 1014 may include various modules for performing communication. The control unit 1014 may include at least one processor such as a modem. The control unit 1014 may include modules for digital signal processing. For example, the control unit 1014 may include a modem. When data is transmitted, the control unit 1014 may generate complex symbols by encoding and modulating a transmitted bit stream. In addition, for example, when data is received, the control unit 1014 may restore a received bit stream by demodulating and decoding a baseband signal. The control unit 1014 may perform functions of a protocol stack required by a communication standard.

Referring to FIG. 10, the functional configuration of the electronic device 1010 is described as equipment to which the antenna structure of the disclosure may be utilized. However, the example shown in FIG. 10 is only a configuration for utilizing an RF filter structure according to various embodiments of the disclosure described through FIGS. 1, 2A, 2B, 3A, 3B, 4, 5A, 5B, 6 to 8, 9A, and 9B, and embodiments of the disclosure are not limited to the components of the equipment illustrated in FIG. 10. Accordingly, an antenna module including an antenna structure, communication equipment having a different configuration, and the antenna structure itself may also be understood as embodiments of the disclosure.

By disposing an interposing board according to the embodiments of the disclosure between an RU board and an RFIC, the burden on the RU board is reduced to reduce the price, and by providing a feeding path to the antenna in a short distance from the RU board, the performance may be improved. That is, by additionally disposing the interposing board according to the embodiments of the disclosure on the RU board, it is possible to improve the performance without changing the existing method.

According to embodiments of the disclosure, a radio unit (RU) device may include a first printed circuit board (PCB) on which a plurality of antenna elements are disposed; a second PCB on which a radio frequency integrated circuit (RFIC) is disposed; and a third PCB configured to electrically connect each of the plurality of antenna elements disposed on the first PCB and the RFIC disposed on the second PCB, wherein a first surface of the third PCB may be coupled to a first surface of the first PCB through a grid array, and wherein positions of feeding ports on the first surface of the third PCB may correspond to positions in which ports of the plurality of antenna elements are disposed on a second surface opposite the first surface of the first PCB.

According to an embodiment, a size of the third PCB may be smaller than a size of the first PCB and greater than a size of the second PCB.

According to an embodiment, the first PCB may include RF paths that correspond to the ports of the plurality of antenna elements and are formed to face from the second surface of the first PCB to the first surface of the first PCB.

According to an embodiment, each of the RF paths may be a plated through hole (PTH) or a via hole formed over a plurality of layers of the first PCB.

According to an embodiment, the third PCB may include a layer on which a feeding line between each of the positions of the feeding ports and a corresponding RFIC port of the third PCB is formed, based on a direction perpendicular to one surface of the third PCB.

According to an embodiment, the second PCB includes RF components and a power interface, and the third PCB may include RF circuitry configured to receive a local oscillator (LO) signal and an intermediate frequency (IF) signal from the second PCB.

According to an embodiment, the feeding ports of the third PCB may be disposed at positions overlapping the plurality of elements when the plurality of elements are viewed in a direction from the second surface of the first PCB toward the first surface of the first PCB.

According to an embodiment, the first PCB may be manufactured by a multi-layer board (MLB) method, and the second PCB may be manufactured by a high density interconnection (HDI) method.

According to an embodiment, the third PCB may be electrically connected to the RFIC and to other RFICs.

According to an embodiment, balls of the grid array may be configured to bond between the feeding ports of the third PCB and RF ports on the first surface of the first PCB, and positions at which the ports of the plurality of antenna elements are disposed on the second surface of the first PCB may correspond to positions at which the RF ports are disposed on the first surface of the first PCB.

According to an embodiment, the second surface opposite the first surface of the third PCB may be coupled to the second PCB through the grid array.

According to embodiments of the disclosure, an electronic device may include a power interface; a local oscillator (LO); an intermediate frequency (IF) conversion circuit; a first printed circuit board (PCB) on which a plurality of antenna elements are disposed; a second PCB on which a radio frequency integrated circuit (RFIC) is disposed; and a third PCB configured to electrically connect each of the plurality of antenna elements disposed on the first PCB and the RFIC disposed on the second PCB, wherein the first surface of the third PCB may be coupled to the first surface of the first PCB through a grid array, and wherein positions of feeding ports on the first surface of the third PCB may correspond to positions at which ports of the plurality of antenna elements are disposed on the second surface opposite the first surface of the first PCB.

According to an embodiment, a size of the third PCB may be smaller than a size of the first PCB and greater than a size of the second PCB.

According to an embodiment, the first PCB may include RF paths that correspond to the ports of the plurality of antenna elements and are formed to face from the second surface of the first PCB to the first surface of the first PCB.

According to an embodiment, each of the RF paths may be a plated through hole (PTH) or a via hole formed over a plurality of layers of the first PCB.

According to an embodiment, the third PCB may include a layer on which a feeding line between each of the positions of the feeding ports and a corresponding RFIC port of the third PCB is formed, based on a direction perpendicular to one surface of the third PCB.

According to an embodiment, the third PCB may include RF signals configured to receive a reference frequency from the LO of the second PCB and an IF frequency signal from the IF conversion circuit.

According to an embodiment, the feeding ports of the third PCB may be disposed at positions overlapping the plurality of elements when the plurality of elements are viewed in a direction from the second surface of the first PCB toward the first surface of the first PCB.

According to an embodiment, the first PCB may be manufactured by a multi-layer board (MLB) method, and the second PCB may be manufactured by a high density interconnection (HDI) method.

According to an embodiment, the third PCB may be electrically connected to the RFIC and other RFICs.

According to an embodiment, balls of the grid array may be configured to bond between the feeding ports of the third PCB and RF ports on the first surface of the first PCB, and positions at which the ports of the plurality of antenna elements are disposed on the second surface of the first PCB may correspond to positions at which the RF ports are disposed on the first surface of the first PCB.

According to an embodiment, the second surface opposite the first surface of the third PCB may be coupled to the second PCB through the grid array.

According to an embodiment, a first RF path of the RF paths comprises a straight line between the first surface of the first PCB and the second surface of the first PCB.

According to an embodiment, the first RF path is disposed perpendicular to the first surface of the first PCB.

According to an embodiment, the RF paths comprise an IF path for an IF signal and a LO path for an LO signal.

The methods according to embodiments described in the claims or the specification of the disclosure may be implemented by hardware (i.e., an electronic device), software, or a combination of hardware and software (i.e., an electronic device executing software instructions).

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A radio unit (RU) device comprising:
a first printed circuit board (PCB) on which a plurality of antenna elements are disposed;
a second PCB on which a radio frequency integrated circuit (RFIC) is disposed; and
a third PCB disposed between the first PCB and the second PCB,
wherein the third PCB is configured to electrically connect each of the plurality of antenna elements disposed on the first PCB and the RFIC disposed on the second PCB,
wherein a first surface of the third PCB is coupled to a first surface of the first PCB through a grid array, and
wherein positions of feeding ports on the first surface of the third PCB correspond to positions in which ports of the plurality of antenna elements are disposed on a second surface opposite the first surface of the first PCB.

2. The RU device of claim 1, wherein the first PCB comprises RF paths that correspond to the ports of the plurality of antenna elements and are formed to face from the second surface of the first PCB to the first surface of the first PCB.

3. The RU device of claim 2, wherein each of the RF paths is a plated through hole (PTH) or a via hole formed over a plurality of layers of the first PCB.

4. The RU device of claim 1, wherein the third PCB comprises a layer on which a feeding line between each of the positions of the feeding ports and a corresponding RFIC port of the third PCB is formed, based on a direction perpendicular to one surface of the third PCB.

5. The RU device of claim 1,
wherein the second PCB comprises:
 RF components, and
 a power interface, and
wherein the third PCB comprises RF circuitry configured to receive a local oscillator (LO) signal and an intermediate frequency (IF) signal from the second PCB.

6. The RU device of claim 1, wherein the feeding ports of the third PCB are disposed at positions overlapping the plurality of antenna elements when the plurality of antenna elements are viewed in a direction from the second surface of the first PCB toward the first surface of the first PCB.

7. The RU device of claim 1, wherein the first PCB is manufactured by a multi-layer board (MLB) method, and the second PCB is manufactured by a high density interconnection (HDI) method.

8. The RU device of claim 1, wherein the third PCB is electrically connected to the RFIC and to other RFICs.

9. The RU device of claim 1,
wherein balls of the grid array are configured to bond between the feeding ports of the third PCB and RF ports on the first surface of the first PCB, and
wherein positions at which the ports of the plurality of antenna elements are disposed on the second surface of the first PCB correspond to positions at which the RF ports are disposed on the first surface of the first PCB.

10. The RU device of claim 1, wherein the second surface opposite the first surface of the third PCB is coupled to the second PCB through the grid array.

11. An electronic device comprising:
a power interface;
a local oscillator (LO);
an intermediate frequency (IF) conversion circuit;
a first printed circuit board (PCB) on which a plurality of antenna elements are disposed;
a second PCB on which a radio frequency integrated circuit (RFIC) is disposed; and
a third PCB disposed between the first PCB and the second PCB,
wherein the third PCB is configured to electrically connect each of the plurality of antenna elements disposed on the first PCB and the RFIC disposed on the second PCB,
wherein a first surface of the third PCB is coupled to the first surface of the first PCB through a grid array, and
wherein positions of feeding ports on the first surface of the third PCB correspond to positions at which ports of the plurality of antenna elements are disposed on a second surface opposite the first surface of the first PCB.

12. The electronic device of claim 11, wherein the first PCB comprises RF paths that correspond to the ports of the plurality of antenna elements, the RF paths formed to face from the second surface of the first PCB to the first surface of the first PCB.

13. The electronic device of claim 12, wherein each of the RF paths is a plated through hole (PTH) or a via hole formed over a plurality of layers of the first PCB.

14. The electronic device of claim 11, wherein the third PCB comprises a layer on which a feeding line between each of the positions of the feeding ports and a corresponding RFIC port of the third PCB is formed, based on a direction perpendicular to one surface of the third PCB.

15. The electronic device of claim 11, wherein the third PCB comprises RF signals configured to receive a reference frequency from the LO of the second PCB and an IF frequency signal from the IF conversion circuit.

16. The electronic device of claim 11, wherein the feeding ports of the third PCB are disposed at positions overlapping the plurality of antenna elements when the plurality of antenna elements are viewed in a direction from the second surface of the first PCB toward the first surface of the first PCB.

17. The electronic device of claim 11, wherein the first PCB may be manufactured by a multi-layer board (MLB) method, and the second PCB may be manufactured by a high density interconnection (HDI) method.

18. The electronic device of claim 11, wherein the third PCB is electrically connected to the RFIC and other RFICs.

19. The electronic device of claim 11,
wherein balls of the grid array are configured to bond between the feeding ports of the third PCB and RF ports on the first surface of the first PCB, and
wherein positions at which the ports of the plurality of antenna elements are disposed on the second surface of the first PCB correspond to positions at which the RF ports are disposed on the first surface of the first PCB.

20. The electronic device of claim 11, wherein the second surface opposite the first surface of the third PCB is coupled to the second PCB through the grid array.

\* \* \* \* \*